United States Patent
Lin et al.

(10) Patent No.: US 8,787,002 B2
(45) Date of Patent: Jul. 22, 2014

(54) WINDING-TYPE SOLID ELECTROLYTIC CAPACITOR PACKAGE STRUCTURE

(75) Inventors: Ching-Feng Lin, Hsinchu County (TW); Chi-Hao Chiu, Hsinchu (TW); Kun-Huang Chang, Hsinchu (TW)

(73) Assignee: Apaq Technology Co., Ltd., Miaoli County (TW)

( * ) Notice: Subject to any disclaimer, the term of this patent is extended or adjusted under 35 U.S.C. 154(b) by 128 days.

(21) Appl. No.: 13/612,816

(22) Filed: Sep. 12, 2012

(65) Prior Publication Data
US 2014/0071589 A1    Mar. 13, 2014

(51) Int. Cl.
*H01G 4/32* (2006.01)
(52) U.S. Cl.
USPC ........... 361/530; 361/516; 361/523; 361/524; 361/529; 361/531
(58) Field of Classification Search
USPC ......... 361/530, 516–519, 524–525, 528–529, 361/531, 535–536, 540
See application file for complete search history.

(56) References Cited

U.S. PATENT DOCUMENTS

| 5,914,852 | A  | * | 6/1999  | Hatanaka et al. | 361/523   |
|-----------|----|---|---------|-----------------|-----------|
| 6,052,273 | A  | * | 4/2000  | Inoue et al.    | 361/523   |
| 6,310,756 | B1 | * | 10/2001 | Miura et al.    | 361/301.3 |
| 7,233,485 | B2 | * | 6/2007  | Fujimoto et al. | 361/531   |
| 7,511,944 | B2 | * | 3/2009  | Kuriyama        | 361/535   |
| 8,116,069 | B2 | * | 2/2012  | Tani et al.     | 361/525   |
| 8,422,200 | B2 | * | 4/2013  | Lee et al.      | 361/523   |

* cited by examiner

*Primary Examiner* — Nguyen T Ha
(74) *Attorney, Agent, or Firm* — Li & Cai Intellectual Property (USA) Office

(57) ABSTRACT

A winding-type solid electrolytic capacitor package structure includes a capacitor unit, a package unit and a conductive unit. The conductive unit includes a winding-type capacitor having a first conductive pin and a second conductive pin. The package unit includes a package body for enclosing the capacitor unit. The conductive unit includes a first conductive terminal electrically connected to the first conductive pin and a second conductive terminal electrically connected to the second conductive pin. The first conductive terminal has a first embedded portion contacting the first conductive pin and enclosed by the package body and a first exposed portion connected to the first embedded portion and exposed from the package body. The second conductive terminal has a second embedded portion contacting the second conductive pin and enclosed by the package body and a second exposed portion connected to the second embedded portion and exposed from the package body.

10 Claims, 11 Drawing Sheets

WINDING-TYPE SOLID ELECTROLYTIC CAPACITOR PACKAGE STRUCTURE

BACKGROUND OF THE INVENTION

1. Field of the Invention

The instant disclosure relates to a capacitor package structure, and more particularly to a winding-type solid electrolytic capacitor package structure.

2. Description of Related Art

The winding-type capacitor includes a capacitor core, a casing, and a sealing cover. The capacitor core has an anode foil coupled to an anode terminal, a cathode foil coupled to a cathode terminal, a separator, and an electrolyte layer. The anode foil, the cathode foil and the separator are rolled together. The separator is disposed between the anode foil and the cathode foil. The electrolyte layer is formed between the anode foil and the cathode foil. The casing has an opening for receiving the capacitor core. The sealing cover can used to seal the casing, and the anode terminal and the cathode terminal can pass through a through hole of the sealing cover. A given space is provided between the sealing cover and the capacitor core. A stopper for securing the space is provided on at least one of the anode terminal and the cathode terminal However, there is no any other package body for packaging the winding-type capacitor in the prior art.

SUMMARY OF THE INVENTION

One aspect of the instant disclosure relates to a winding-type solid electrolytic capacitor package structure.

One of the embodiments of the instant disclosure provides a winding-type solid electrolytic capacitor package structure, comprising: a capacitor unit, a package unit and a conductive unit. The capacitor unit includes at least one winding-type capacitor, wherein the at least one winding-type capacitor having at least one first conductive pin and at least one second conductive pin. The package unit includes a package body enclosing the capacitor unit, wherein the package body has a first lateral face, a second lateral face opposite to the first lateral face, and a bottom face connected between the first lateral face and the second lateral face. The conductive unit includes at least one first conductive terminal electrically connected to the at least one first conductive pin and at least one second conductive terminal electrically connected to the at least one second conductive pin, wherein the at least one first conductive terminal and the at least one second conductive terminal are separated from each other, the at least one first conductive terminal has a first embedded portion contacting the at least one first conductive pin and enclosed by the package body and a first exposed portion connected to the first embedded portion and exposed from the package body, and the at least one second conductive terminal has a second embedded portion contacting the at least one second conductive pin and enclosed by the package body and a second exposed portion connected to the second embedded portion and exposed from the package body.

Another one of the embodiments of the instant disclosure provides a winding-type solid electrolytic capacitor package structure, comprising: a capacitor unit, a package unit and a conductive unit. The capacitor unit includes at least one winding-type capacitor, wherein the at least one winding-type capacitor having at least one first conductive pin and at least one second conductive pin. The package unit includes a package body enclosing the capacitor unit, wherein the package body has a first lateral face, a second lateral face opposite to the first lateral face, and a bottom face connected between the first lateral face and the second lateral face. The conductive unit includes at least one first conductive terminal electrically connected to the at least one first conductive pin and at least one second conductive terminal electrically connected to the at least one second conductive pin, wherein the at least one first conductive terminal and the at least one second conductive terminal are separated from each other, the at least one first conductive terminal has a first exposed bottom surface exposed from the bottom face of the package body and a first exposed lateral surface exposed from the first lateral face of the package body, and the at least one second conductive terminal has a second exposed bottom surface exposed from the bottom face of the package body and a second exposed lateral surface exposed from the second lateral face of the package body.

More precisely, the at least one first conductive pin has a first flat top surface and a first flat bottom surface respectively formed on a top side and a bottom side thereof, the at least one second conductive pin has a second flat top surface and a second flat bottom surface respectively formed on a top side and a bottom side thereof, and the first flat bottom surface and the second flat bottom surface respectively contact the at least one first conductive terminal and the at least one second conductive terminal To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1A:
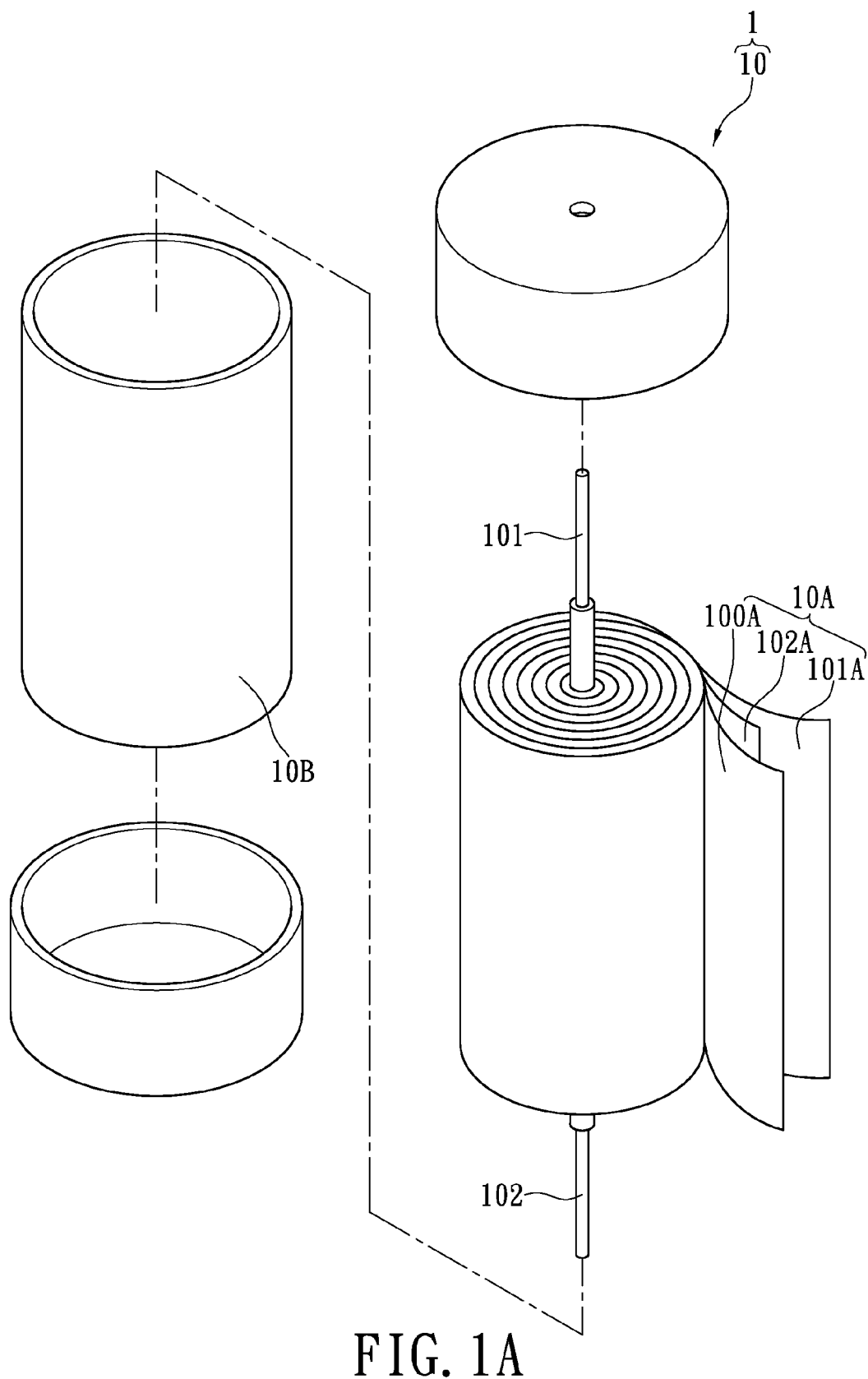
FIG. 1A shows a perspective, exploded, schematic view of the capacitor unit of the winding-type solid electrolytic capacitor package structure according to the first embodiment of the instant disclosure.
Figure 1B:
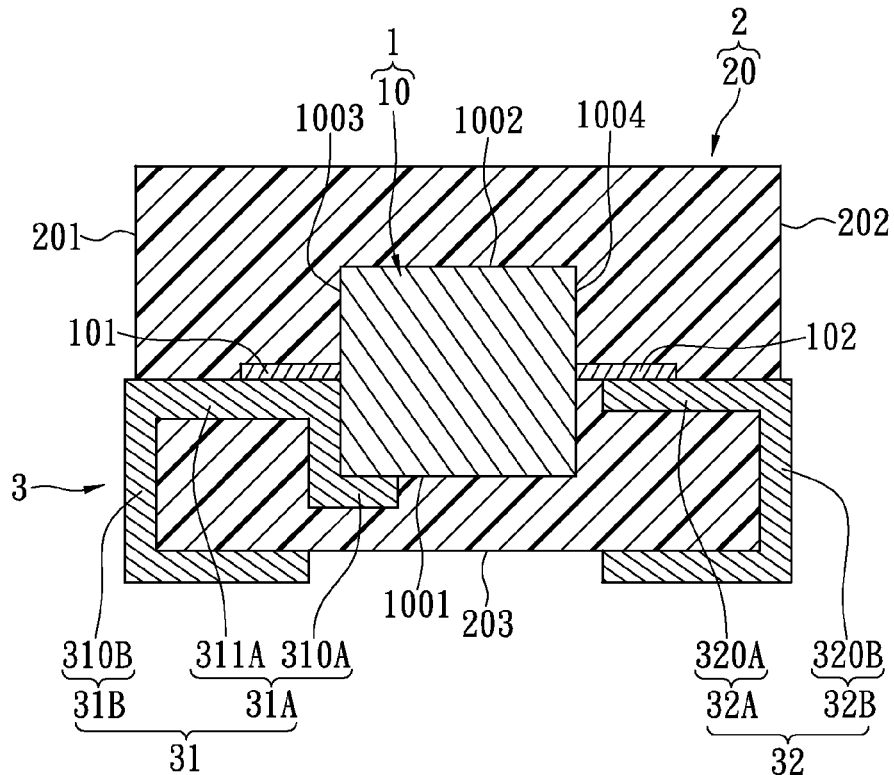
FIG. 1B shows a cross-sectional, schematic view of the winding-type solid electrolytic capacitor package structure according to the first embodiment of the instant disclosure.
Figure 1C:
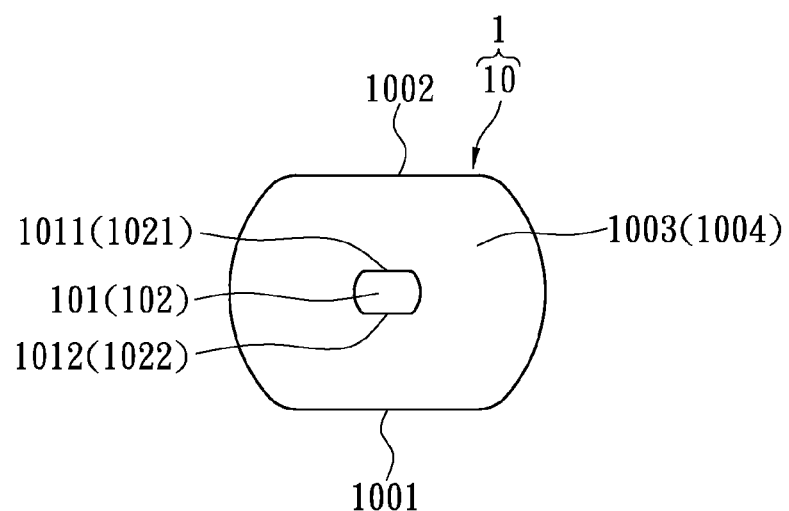
FIG. 1C shows a lateral, schematic view of the capacitor unit of the winding-type solid electrolytic capacitor package structure according to the first embodiment of the instant disclosure.

Referring to FIG. 1A to FIG. 1C, where the first embodiment of the instant disclosure provides a winding-type solid electrolytic capacitor package structure, comprising: a capacitor unit 1, a package unit 2 and a conductive unit 3.

First, referring to FIG. 1A, the capacitor unit 1 includes at least one winding-type capacitor 10, and the winding-type capacitor 10 has at least one first conductive pin 101 and at least one second conductive pin 102. For more precisely, the winding-type capacitor 10 includes a capacitor core 10A and an external casing 10B enclosing the capacitor core 10A, the capacitor core 10A is formed by wrapping at least one positive foil sheet 100A, at least one negative foil sheet 101A and an isolation paper 102A, and the isolation paper 102A absorbing conductive polymer is stacked between the positive foil sheet 100A and the negative foil sheet 101A.

Moreover, referring to FIG. 1B, the package unit 2 includes a package body 20 enclosing the capacitor unit 1, and the package body 20 has a first lateral face 201, a second lateral face 202 opposite to the first lateral face 201, and a bottom face 203 connected between the first lateral face 201 and the second lateral face 202. For example, the package body 20 may be an opaque encapsulation gel formed by epoxy or silicone.

Furthermore, referring to FIG. 1A and FIG. 1B, the conductive unit 3 includes at least one first conductive terminal 31 (such as a positive conductive terminal) electrically connected to (or electrically contacting) the first conductive pin 101 and at least one second conductive terminal 32 (such as a negative conductive terminal) electrically connected to (or electrically contacting) the second conductive pin 102. The first conductive terminal 31 and the second conductive terminal 32 are separated from each other, the first conductive terminal 31 has a first embedded portion 31A contacting the first conductive pin 101 and enclosed by the package body 20 and a first exposed portion 31B connected to the first embedded portion 31A and exposed from the package body 20, and the second conductive terminal 32 has a second embedded portion 32A contacting the second conductive pin 102 and enclosed by the package body 20 and a second exposed portion 32B connected to the second embedded portion 32A and exposed from the package body 20.

For more precisely, referring to FIG. 1B, the first embedded portion 31A of the first conductive terminal 31 has a L-shaped contacting section 310A contacting the winding-type capacitor 10 and a first plate contacting section 311A extended outwardly from the L-shaped contacting section 310A and contacting the first conductive pin 101. The first exposed portion 31B of the first conductive terminal 31 has a first L-shaped exposed section 310B bent downwardly from the first plate contacting section 311A, and the first L-shaped exposed section 310B contacts the bottom face 203 and the first lateral face 201 of the package body 20. In addition, the second embedded portion 32A of the second conductive terminal 32 has a second plate contacting section 320A contacting the second conductive pin 102. The second exposed portion 32B of the second conductive terminal 32 has a second L-shaped exposed section 320B bent downwardly from the second plate contacting section 320A, and the second L-shaped exposed section 320B contacts the bottom face 203 and the second lateral face 202 of the package body 20.

In addition, referring to FIG. 1B and FIG. 1C, when the winding-type capacitor 10 is horizontally disposed inside the package body 20 and the top side and the bottom side of the winding-type capacitor 10 are flattened, the winding-type capacitor 10 has a first flat surface 1001 and a second flat surface 1002 respective formed on the bottom side and the top side thereof, and the winding-type capacitor 10 has a first lateral surface 1003 and a second lateral surface 1004 respectively formed on a left lateral side and a right lateral side thereof. Hence, the L-shaped contacting section 310A of the first embedded portion 31A can contact the first flat surface 1001 and the first lateral surface 1003 of the winding-type capacitor 10, and the first conductive pin 101 and the second conductive pin 102 are respectively extended from the first lateral surface 1003 and the second lateral surface 1004 of the winding-type capacitor 10 for respectively contacting the first conductive terminal 31 and the second conductive terminal 32.

For more precisely, because the top side and the bottom side of the first conductive pin 101 and the top side and the bottom side of the second conductive pin 102 are flattened, the first conductive pin 101 has a first flat top surface 1011 and a first flat bottom surface 1012 respectively formed on the top side and the bottom side thereof, the second conductive pin 102 has a second flat top surface 1021 and a second flat bottom surface 1022 respectively formed on the top side and the bottom side thereof, and the first flat bottom surface 1012 and the second flat bottom surface 1022 respectively contact the first conductive terminal 31 and the second conductive terminal 32. Therefore, because the contact surface between the first conductive pin 101 and the first conductive terminal 31 and the contact surface between the second conductive pin 102 and the second conductive terminal 32 can be increased, the first conductive pin 101 and the second conductive pin 102 can respectively firmly contact the first conductive terminal 31 and the second conductive terminal 32.

Second Embodiment

Figure 2:
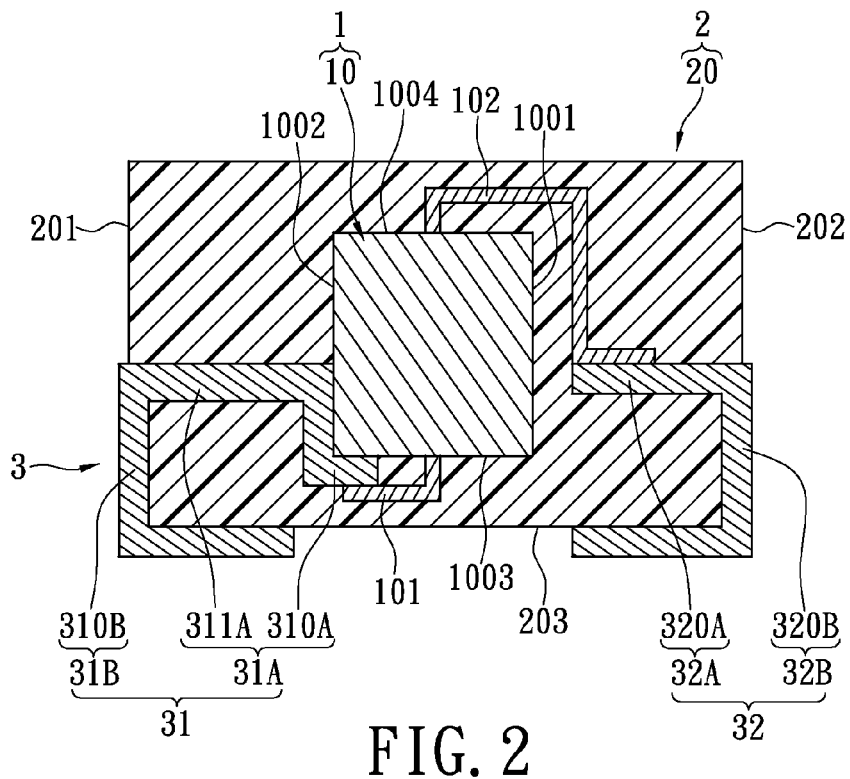
FIG. 2 shows a cross-sectional, schematic view of the winding-type solid electrolytic capacitor package structure according to the second embodiment of the instant disclosure.

Referring to FIG. 2, where the second embodiment of the instant disclosure provides a winding-type solid electrolytic capacitor package structure, comprising: a capacitor unit 1, a package unit 2 and a conductive unit 3. Comparing FIG. 2 with FIG. 1B, the difference between the second embodiment and the first embodiment is as follows: in the second embodiment, when the winding-type capacitor 10 is vertically disposed inside the package body 20 and the right lateral side and the left lateral side of the winding-type capacitor 10 are flattened, the winding-type capacitor 10 has a first flat surface 1001 and a second flat surface 1002 respective formed on the right lateral side and the left lateral side thereof, and the winding-type capacitor 10 has a first lateral surface 1003 and a second lateral surface 1004 respectively formed on the bottom side and the top side thereof. Hence, the L-shaped contacting section 310A of the first embedded portion 31A can contact the second flat surface 1002 and the first lateral surface 1003 of the winding-type capacitor 10, and the first conductive pin 101 and the second conductive pin 102 are respectively extended from the first lateral surface 1003 and the second lateral surface 1004 of the winding-type capacitor 10 for respectively contacting the first conductive terminal 31 and the second conductive terminal 32.

Third Embodiment

Figure 3:
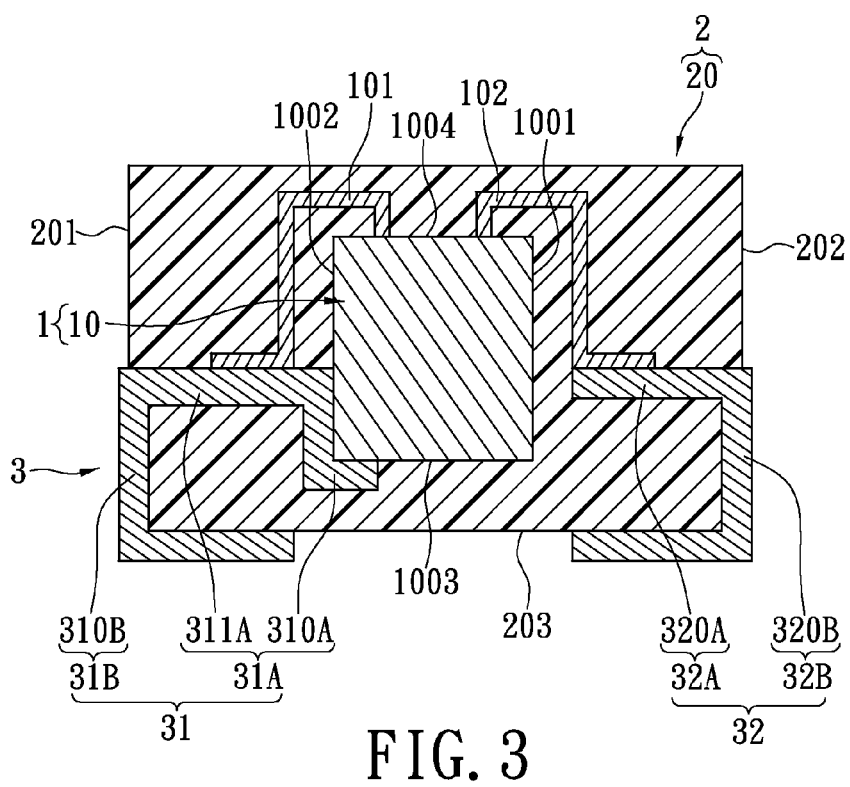
FIG. 3 shows a cross-sectional, schematic view of the winding-type solid electrolytic capacitor package structure according to the third embodiment of the instant disclosure.

Referring to FIG. 3, where the third embodiment of the instant disclosure provides a winding-type solid electrolytic capacitor package structure, comprising: a capacitor unit 1, a package unit 2 and a conductive unit 3. Comparing FIG. 3 with FIG. 2, the difference between the third embodiment and the second embodiment is as follows: in the third embodiment, both the first conductive pin 101 and the second conductive pin 102 are extended from the second lateral surface 1004 of the winding-type capacitor 10 for respectively contacting the first conductive terminal 31 and the second conductive terminal 32.

Fourth Embodiment

Figure 4:
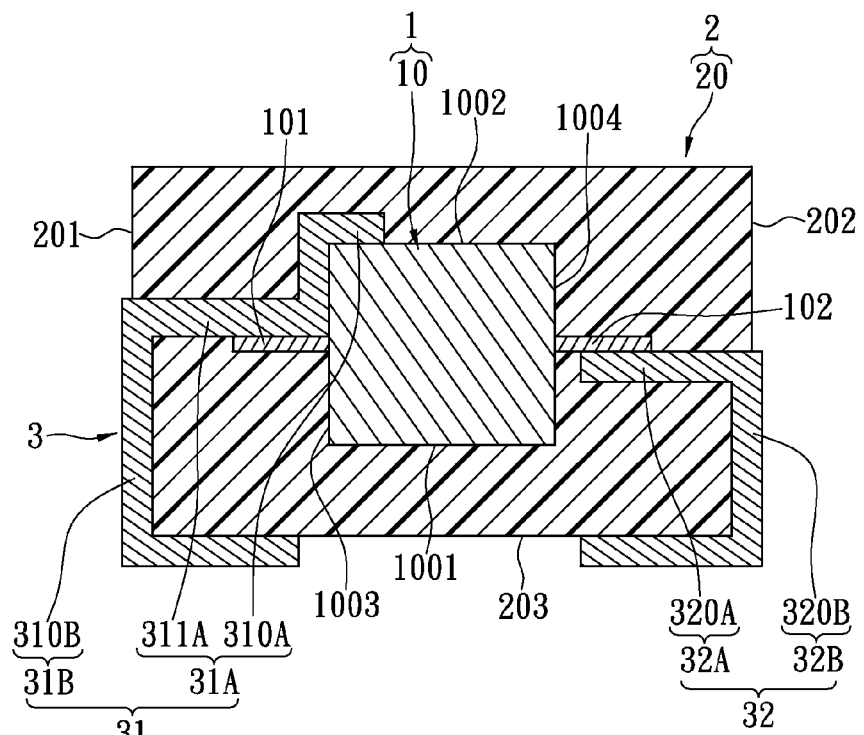
FIG. 4 shows a cross-sectional, schematic view of the winding-type solid electrolytic capacitor package structure according to the fourth embodiment of the instant disclosure.

Referring to FIG. 4, where the fourth embodiment of the instant disclosure provides a winding-type solid electrolytic capacitor package structure, comprising: a capacitor unit 1, a package unit 2 and a conductive unit 3. The capacitor unit 1 includes at least one winding-type capacitor 10, and the winding-type capacitor 10 has at least one first conductive pin 101 and at least one second conductive pin 102. The package unit 2 includes a package body 20 enclosing the capacitor unit 1, and the package body 20 has a first lateral face 201, a second lateral face 202 opposite to the first lateral face 201, and a bottom face 203 connected between the first lateral face 201 and the second lateral face 202. The conductive unit 3 includes at least one first conductive terminal 31 (such as a positive conductive terminal) electrically connected to (or electrically contacting) the first conductive pin 101 and at least one second conductive terminal 32 (such as a negative conductive terminal) electrically connected to (or electrically contacting) the second conductive pin 102. The first conductive terminal 31 and the second conductive terminal 32 are separated from each other, the first conductive terminal 31 has a first embedded portion 31A contacting the first conductive pin 101 and enclosed by the package body 20 and a first exposed portion 31B connected to the first embedded portion 31A and exposed from the package body 20, and the second conductive terminal 32 has a second embedded portion 32A contacting the second conductive pin 102 and enclosed by the package body 20 and a second exposed portion 32B connected to the second embedded portion 32A and exposed from the package body 20.

For more precisely, when the winding-type capacitor 10 is horizontally disposed inside the package body 20 and the top side and the bottom side of the winding-type capacitor 10 are flattened, the winding-type capacitor 10 has a first flat surface 1001 and a second flat surface 1002 respective formed on the bottom side and the top side thereof, and the winding-type capacitor 10 has a first lateral surface 1003 and a second lateral surface 1004 respectively formed on the left lateral side and the right lateral side thereof. Hence, the L-shaped contacting section 310A of the first embedded portion 31A can contact the second flat surface 1002 and the first lateral surface 1003 of the winding-type capacitor 10, and the first conductive pin 101 and the second conductive pin 102 are respectively extended from the first lateral surface 1003 and the second lateral surface 1004 of the winding-type capacitor 10 for respectively contacting the first conductive terminal 31 and the second conductive terminal 32.

Fifth Embodiment

Figure 5:
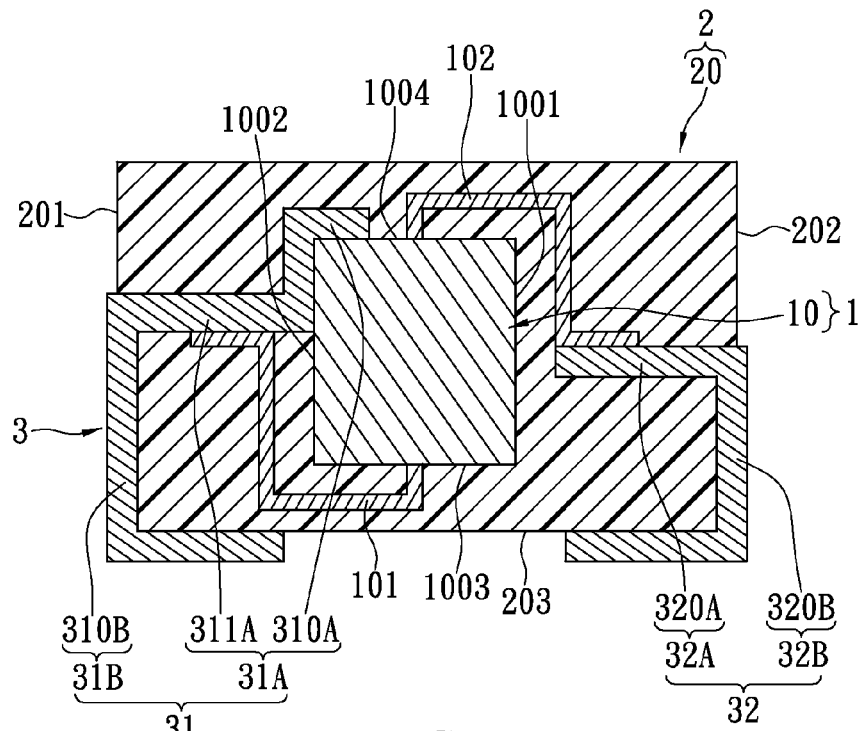
FIG. 5 shows a cross-sectional, schematic view of the winding-type solid electrolytic capacitor package structure according to the fifth embodiment of the instant disclosure.

Referring to FIG. 5, where the fifth embodiment of the instant disclosure provides a winding-type solid electrolytic capacitor package structure, comprising: a capacitor unit 1, a package unit 2 and a conductive unit 3. Comparing FIG. 5 with FIG. 4, the difference between the fifth embodiment and the fourth embodiment is as follows: in the fifth embodiment, when the winding-type capacitor 10 is vertically disposed inside the package body 20 and the right lateral side and the left lateral side of the winding-type capacitor 10 are flattened, the winding-type capacitor 10 has a first flat surface 1001 and a second flat surface 1002 respective formed on the right lateral side and the left lateral side thereof, and the winding-type capacitor 10 has a first lateral surface 1003 and a second lateral surface 1004 respectively formed on the bottom side and the top side thereof. Hence, the L-shaped contacting section 310A of the first embedded portion 31A can contact the second flat surface 1002 and the second lateral surface 1004 of the winding-type capacitor 10, and the first conductive pin 101 and the second conductive pin 102 are respectively extended from the first lateral surface 1003 and the second lateral surface 1004 of the winding-type capacitor 10 for respectively contacting the first conductive terminal 31 and the second conductive terminal 32.

Sixth Embodiment

Figure 6:
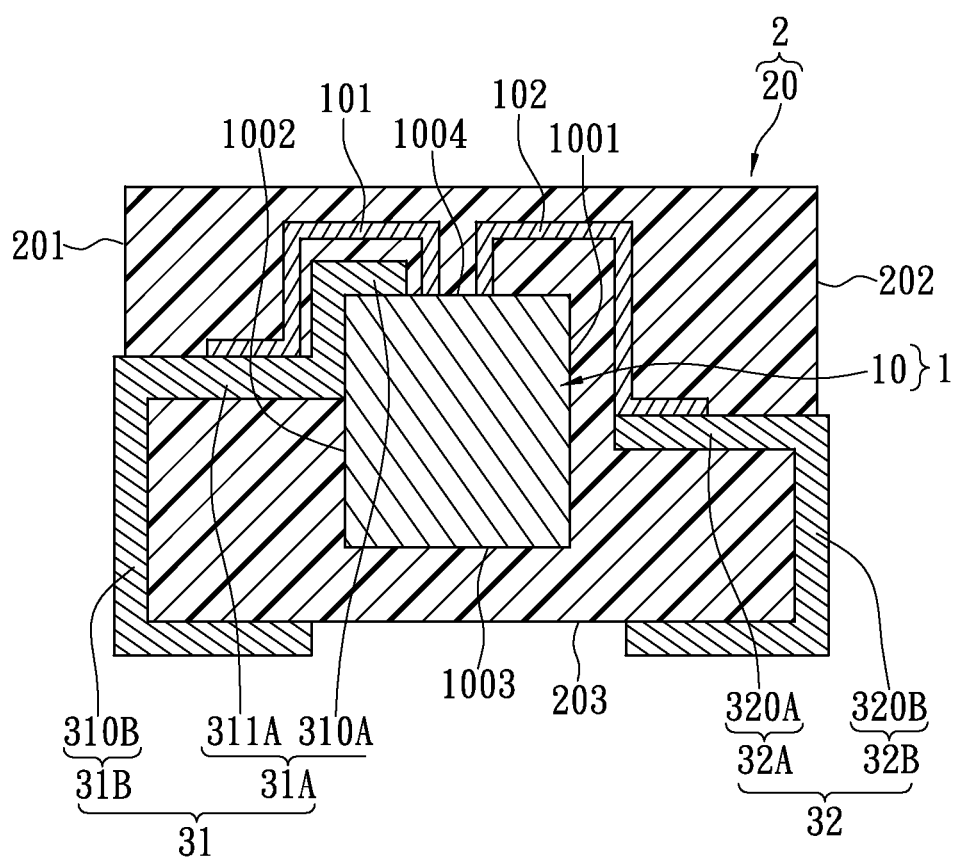
FIG. 6 shows a cross-sectional, schematic view of the winding-type solid electrolytic capacitor package structure according to the sixth embodiment of the instant disclosure.

Referring to FIG. 6, where the sixth embodiment of the instant disclosure provides a winding-type solid electrolytic capacitor package structure, comprising: a capacitor unit 1, a package unit 2 and a conductive unit 3. Comparing FIG. 6 with FIG. 5, the difference between the sixth embodiment and the fifth embodiment is as follows: in the sixth embodiment, both the first conductive pin 101 and the second conductive pin 102 are extended from the second lateral surface 1004 of the winding-type capacitor 10 for respectively contacting the first conductive terminal 31 and the second conductive terminal 32.

Seventh Embodiment

Figure 7A:
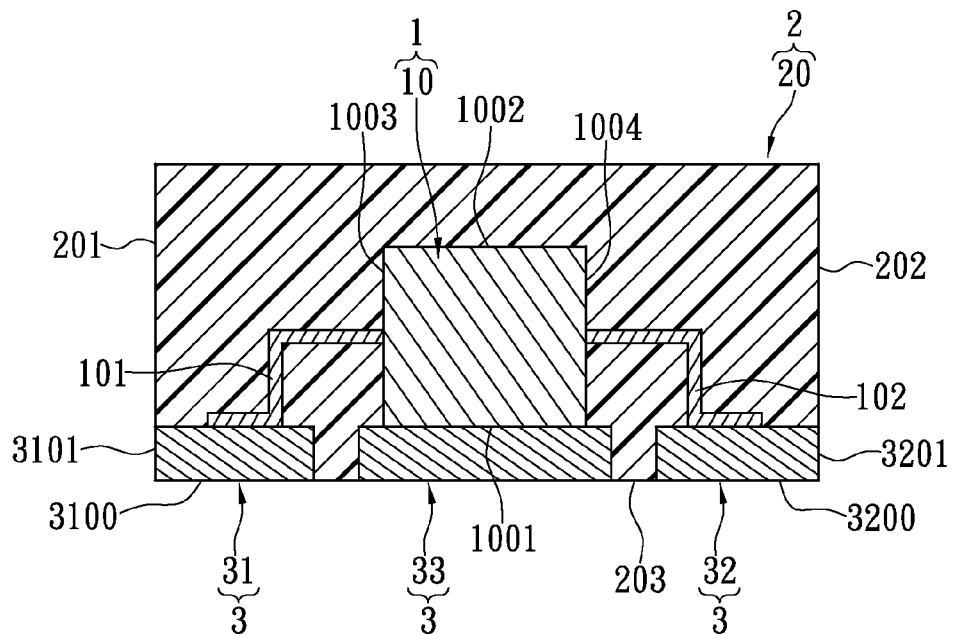
FIG. 7A shows a cross-sectional, schematic view of the winding-type capacitor of the winding-type solid electrolytic capacitor package structure using two conductive pins according to the seventh embodiment of the instant disclosure.

Referring to FIG. 7A, where the seventh embodiment of the instant disclosure provides a winding-type solid electrolytic capacitor package structure, comprising: a capacitor unit 1, a package unit 2 and a conductive unit 3. The capacitor unit 1 includes at least one winding-type capacitor 10, and the winding-type capacitor 10 has at least one first conductive pin 101 and at least one second conductive pin 102. The package unit 2 includes a package body 20 enclosing the capacitor unit 1, and the package body 20 has a first lateral face 201, a second lateral face 202 opposite to the first lateral face 201, and a bottom face 203 connected between the first lateral face 201 and the second lateral face 202. The conductive unit 3 includes at least one first conductive terminal 31 (such as a positive conductive terminal) electrically connected to (or electrically contacting) the first conductive pin 101, at least one second conductive terminal 32 (such as a negative conductive terminal) electrically connected to (or electrically contacting) the second conductive pin 102, and at least one third conductive terminal 33 disposed between the first conductive terminal 31 and the second conductive terminal 32 for supporting the winding-type capacitor 10. The first conductive terminal 31, the second conductive terminal 32 and the third conductive terminal 33 are separated from each other, the first conductive terminal 31 has a first exposed bottom surface 3100 exposed from the bottom face 203 of the package body 20 and a first exposed lateral surface 3101 exposed from the first lateral face 201 of the package body 20, and the second conductive terminal 32 has a second exposed bottom surface 3200 exposed from the bottom face 203 of the package body 20 and a second exposed lateral surface 3201 exposed from the second lateral face 202 of the package body 20.

For more precisely, when the winding-type capacitor 10 is horizontally disposed inside the package body 20 and the top side and the bottom side of the winding-type capacitor 10 are flattened, the winding-type capacitor 10 has a first flat surface 1001 and a second flat surface 1002 respective formed on the bottom side and the top side thereof, and the winding-type capacitor 10 has a first lateral surface 1003 and a second lateral surface 1004 respectively formed on the left lateral side and the right lateral side thereof. Hence, the first conductive pin 101 and the second conductive pin 102 are respectively extended from the first lateral surface 1003 and the second lateral surface 1004 of the winding-type capacitor 10 for respectively contacting the first conductive terminal 31 and the second conductive terminal 32. In addition, the first exposed bottom surface 3100 of the first conductive terminal 31, the second exposed bottom surface 3200 of the second conductive terminal 32 and the bottom face 203 of the package body 20 can be flushed with each other, and the second exposed lateral surface 3201 of the second conductive terminal 32 and the second lateral face 202 of the package body 20 can be flushed with each other.

Figure 7B:
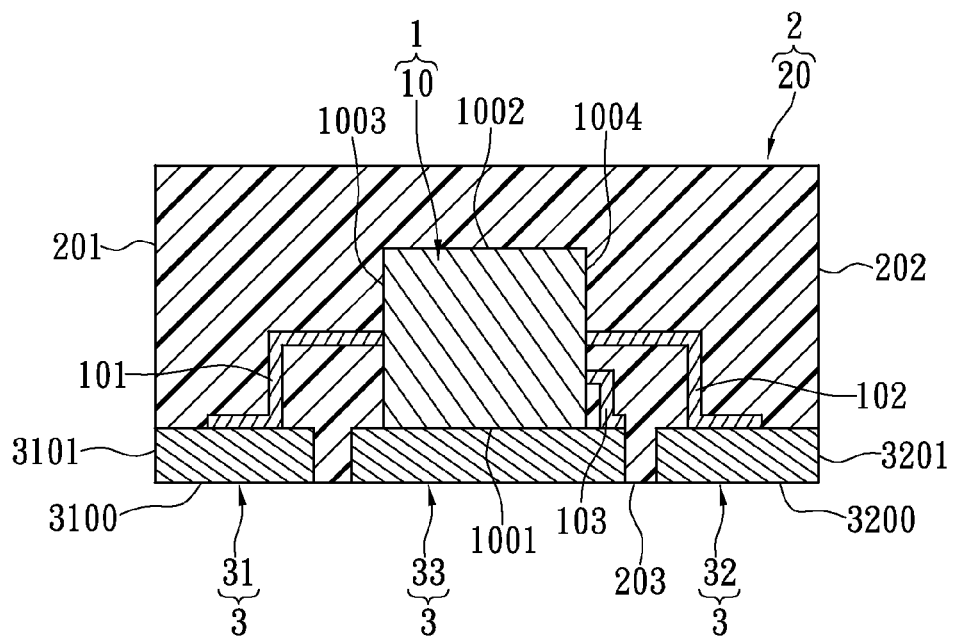
FIG. 7B shows a cross-sectional, schematic view of the winding-type capacitor of the winding-type solid electrolytic capacitor package structure using three conductive pins according to the seventh embodiment of the instant disclosure.

Of course, referring to FIG. 7B, the winding-type capacitor 10 has at least one third conductive pin 103 electrically connected to (electrically contacting) the third conductive terminal 33, thus the second conductive terminal 32 and the third conductive terminal 33 have the same electric polarity such as the same positive electric polarity or the same negative electric polarity.

Eighth Embodiment

Figure 8A:
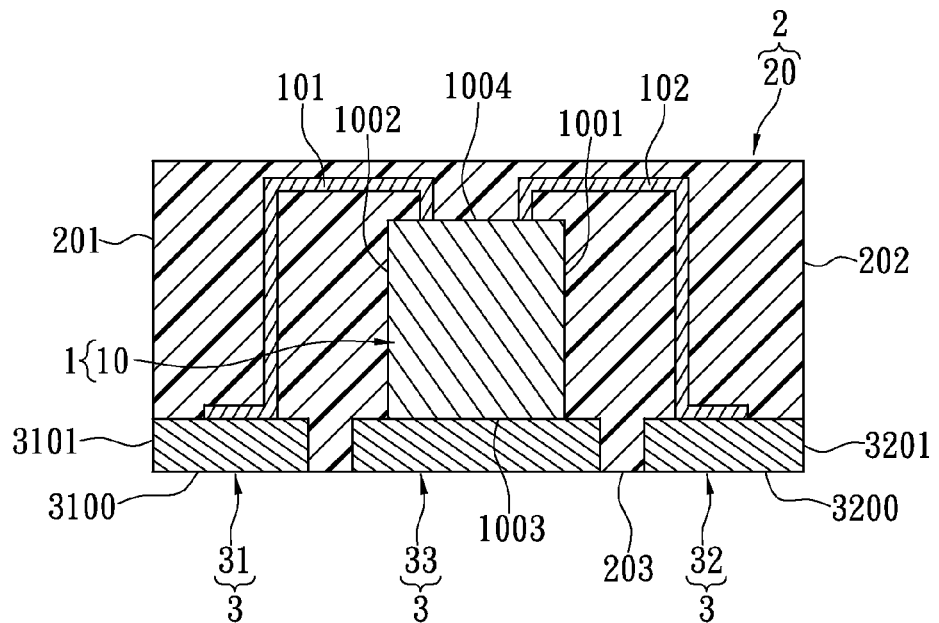
FIG. 8A shows a cross-sectional, schematic view of the winding-type capacitor of the winding-type solid electrolytic capacitor package structure using two conductive pins according to the eighth embodiment of the instant disclosure.

Referring to FIG. 8A, where the eighth embodiment of the instant disclosure provides a winding-type solid electrolytic capacitor package structure, comprising: a capacitor unit 1, a package unit 2 and a conductive unit 3. Comparing FIG. 8A with FIG. 7A, the difference between the eighth embodiment and the seventh embodiment is as follows: in the eighth embodiment, when the winding-type capacitor 10 is vertically disposed inside the package body 20 and the right lateral side and the left lateral side of the winding-type capacitor 10 are flattened, the winding-type capacitor 10 has a first flat surface 1001 and a second flat surface 1002 respective formed on the right lateral side and the left lateral side thereof, and the winding-type capacitor 10 has a first lateral surface 1003 and a second lateral surface 1004 respectively formed on the bottom side and the top side thereof. Hence, both the first conductive pin 101 and the second conductive pin 102 are extended from the second lateral surface 1004 of the winding-type capacitor 10 for respectively contacting the first conductive terminal 31 and the second conductive terminal 32.

Figure 8B:
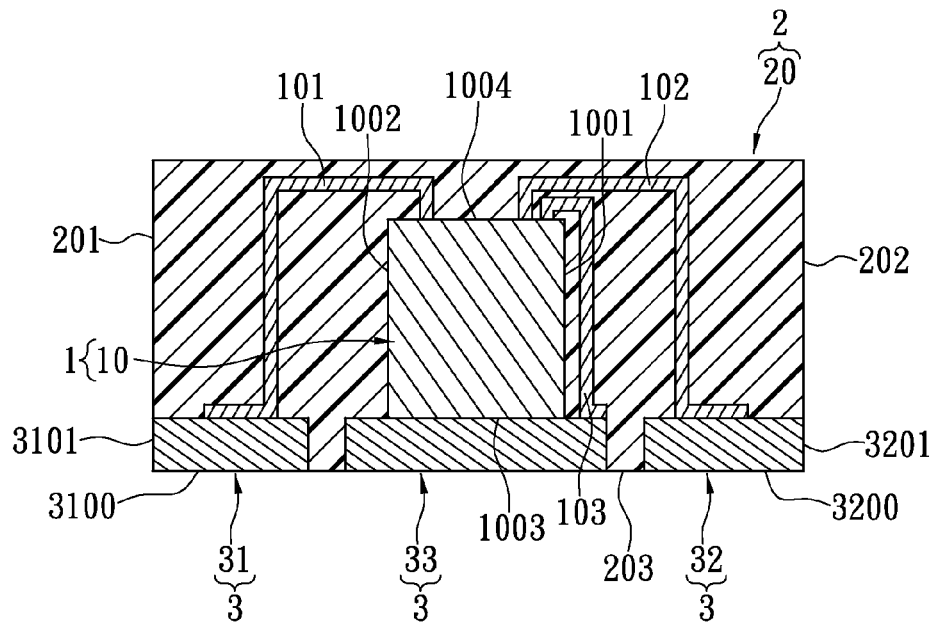
FIG. 8B shows a cross-sectional, schematic view of the winding-type capacitor of the winding-type solid electrolytic capacitor package structure using three conductive pins according to the eighth embodiment of the instant disclosure.

Of course, referring to FIG. 8B, the winding-type capacitor 10 has at least one third conductive pin 103 electrically connected to (electrically contacting) the third conductive terminal 33, thus the second conductive terminal 32 and the third conductive terminal 33 have the same electric polarity such as the same positive electric polarity or the same negative electric polarity.

Ninth Embodiment

Figure 9:
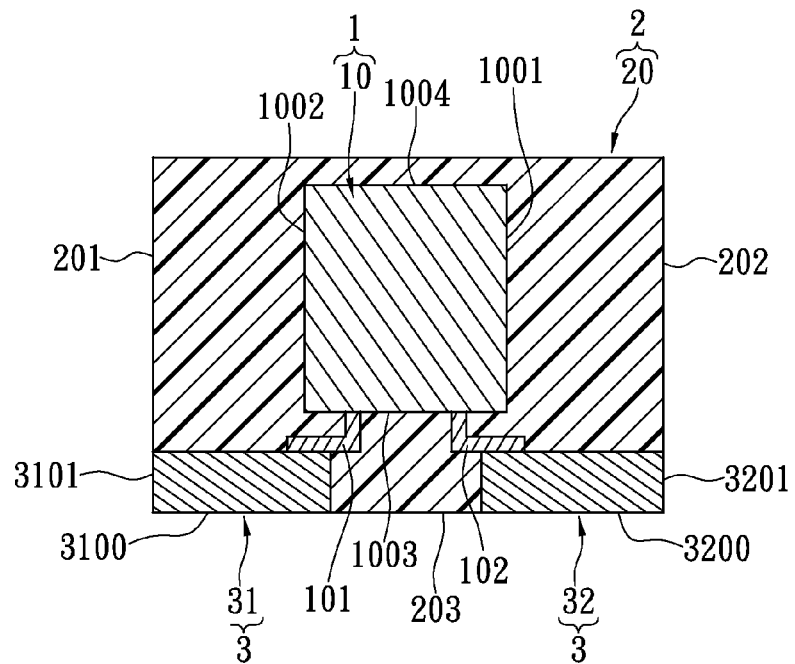
FIG. 9 shows a cross-sectional, schematic view of the winding-type solid electrolytic capacitor package structure according to the ninth embodiment of the instant disclosure.

Referring to FIG. 9, where the ninth embodiment of the instant disclosure provides a winding-type solid electrolytic capacitor package structure, comprising: a capacitor unit 1, a package unit 2 and a conductive unit 3. The capacitor unit 1 includes at least one winding-type capacitor 10, and the winding-type capacitor 10 has at least one first conductive pin 101 and at least one second conductive pin 102. The package unit 2 includes a package body 20 enclosing the capacitor unit 1, and the package body 20 has a first lateral face 201, a second lateral face 202 opposite to the first lateral face 201, and a bottom face 203 connected between the first lateral face 201 and the second lateral face 202. The conductive unit 3 includes at least one first conductive terminal 31 (such as a positive conductive terminal) electrically connected to (or electrically contacting) the first conductive pin 101 and at least one second conductive terminal 32 (such as a negative conductive terminal) electrically connected to (or electrically contacting) the second conductive pin 102. The first conductive terminal 31 and the second conductive terminal 32 are separated from each other, the first conductive terminal 31 has a first exposed bottom surface 3100 exposed from the bottom face 203 of the package body 20 and a first exposed lateral surface 3101 exposed from the first lateral face 201 of the package body 20, and the second conductive terminal 32 has a second exposed bottom surface 3200 exposed from the bottom face 203 of the package body 20 and a second exposed lateral surface 3201 exposed from the second lateral face 202 of the package body 20.

For more precisely, when the winding-type capacitor 10 is vertically disposed inside the package body 20 and the right lateral side and the left lateral side of the winding-type capacitor 10 are flattened, the winding-type capacitor 10 has a first flat surface 1001 and a second flat surface 1002 respective formed on the right lateral side and the left lateral side thereof, and the winding-type capacitor 10 has a first lateral surface 1003 and a second lateral surface 1004 respectively formed on the bottom side and the top side thereof. Hence, both the first conductive pin 101 and the second conductive pin 102 are extended from the first lateral surface 1003 of the winding-type capacitor 10 for respectively contacting the first conductive terminal 31 and the second conductive terminal 32. In addition, the first exposed bottom surface 3100 of the first conductive terminal 31, the second exposed bottom surface 3200 of the second conductive terminal 32 and the bottom face 203 of the package body 20 can be flushed with each other, the first exposed lateral surface 3101 of the first conductive terminal 31 and the first lateral face 201 of the package body 20 can be flushed with each other, and the second exposed lateral surface 3201 of the second conductive terminal 32 and the second lateral face 202 of the package body 20 can be flushed with each other.

Tenth Embodiment

Figure 10:
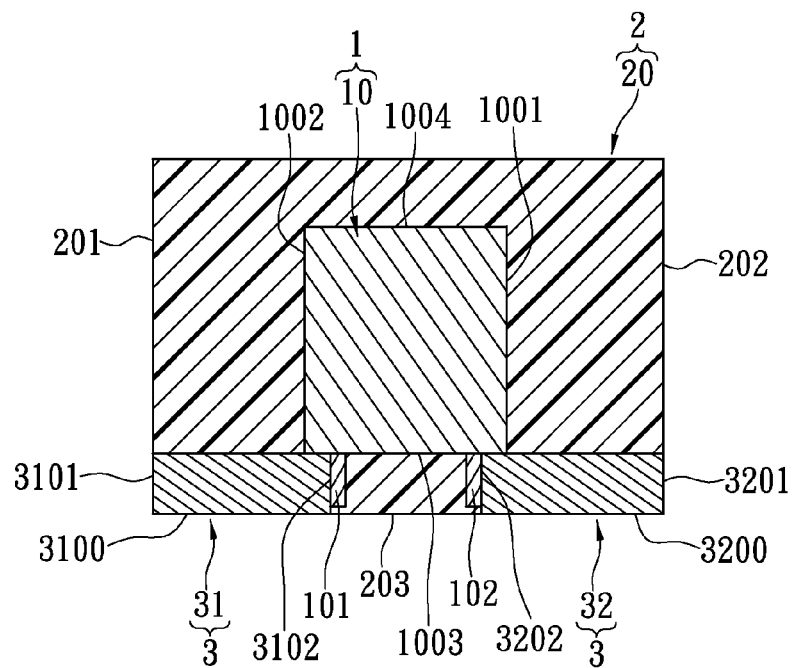
FIG. 10 shows a cross-sectional, schematic view of the winding-type solid electrolytic capacitor package structure according to the tenth embodiment of the instant disclosure.

Referring to FIG. 10, where the tenth embodiment of the instant disclosure provides a winding-type solid electrolytic capacitor package structure, comprising: a capacitor unit 1, a package unit 2 and a conductive unit 3. Comparing FIG. 10 with FIG. 9, the difference between the tenth embodiment and the ninth embodiment is as follows: in the tenth embodiment, the first conductive pin 101 and the second conductive pin 102 can respectively contact a first hidden lateral surface 3102 of the first conductive terminal 31 and a second hidden lateral surface 3202 of the second conductive terminal 32.

Eleventh Embodiment

Figure 11A:
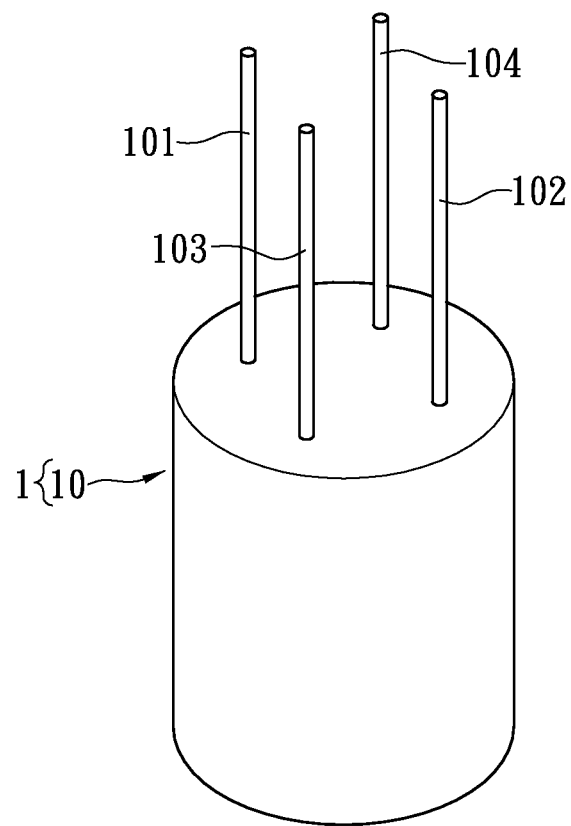
FIG. 11A shows a cross-sectional, schematic view of the winding-type capacitor of the winding-type solid electrolytic capacitor package structure vertically disposed in the package body and using four conductive pins according to the eleventh embodiment of the instant disclosure.
Figure 11B:
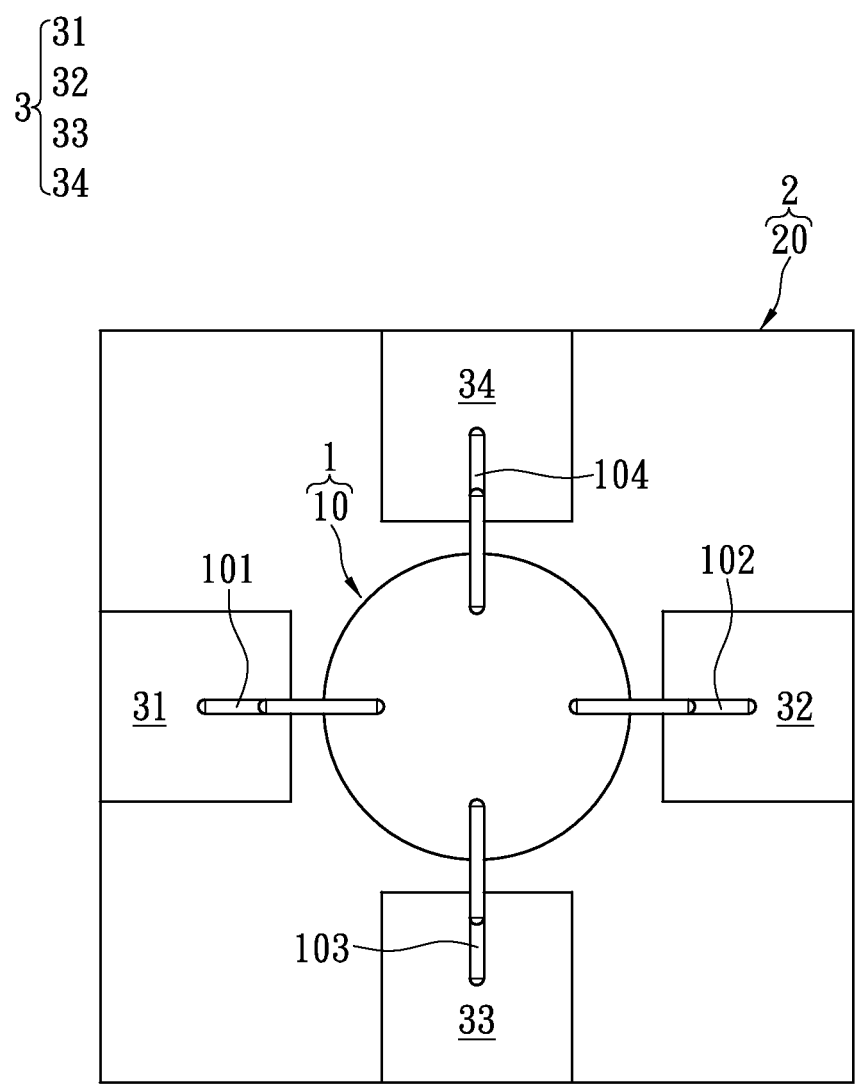
FIG. 11B shows a top, schematic view of the winding-type capacitor of the winding-type solid electrolytic capacitor package structure vertically disposed in the package body and using four conductive pins to respectively electrically connect to the four conductive terminals according to the eleventh embodiment of the instant disclosure.

Referring to FIG. 11A and FIG. 11B, where the eleventh embodiment of the instant disclosure provides a winding-type solid electrolytic capacitor package structure, comprising: a capacitor unit 1, a package unit 2 and a conductive unit 3. Comparing FIG. 10 with FIG. 9, the difference between the eleventh embodiment and the other embodiments is as follows: in the eleventh embodiment, when the winding-type capacitor 10 is vertically disposed inside the package body 20, the winding-type capacitor 10 has at least one first conductive pin 101, at least one second conductive pin 102, at least one third conductive pin 103 and at least one fourth conductive pin 104, and the conductive unit 3 includes at least one first conductive terminal 31 electrically connected to (or electrically contacting) the first conductive pin 101, at least one second conductive terminal 32 electrically connected to (or electrically contacting) the second conductive pin 102, at least one third conductive terminal 33 electrically connected to (or electrically contacting) the third conductive pin 103, and at least one fourth conductive terminal 34 electrically connected to (or electrically contacting) the fourth conductive pin 104. In other words, the winding-type capacitor 10 of the eleventh embodiment having four conductive pins (101, 102, 103 and 104) can be enclosed by the package body 20, the conductive unit 3 of the eleventh embodiment having four conductive terminals (31, 32, 33 and 34), and any one of the four conductive terminals (31, 32, 33 and 34) can be a positive or a negative electrode.

Figure 11C:
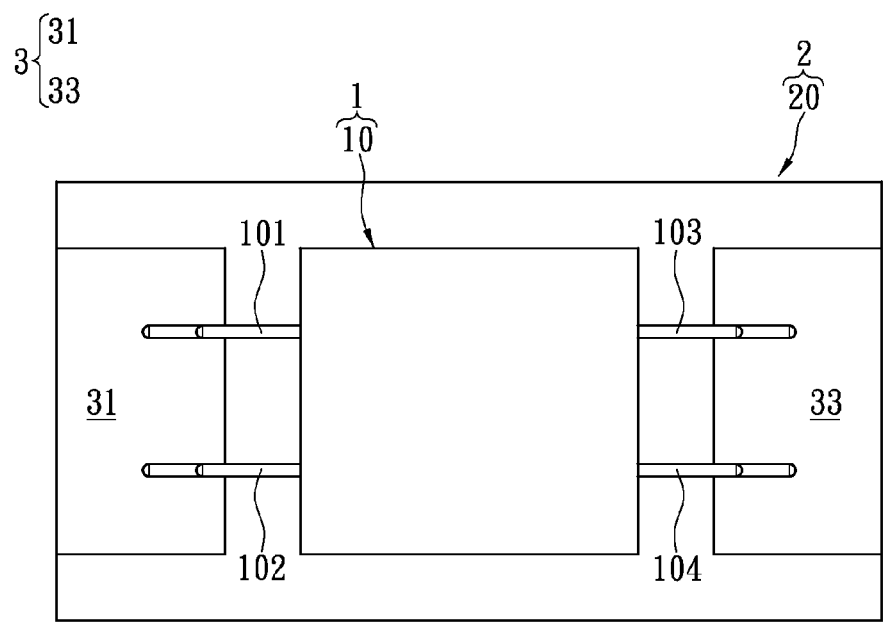
FIG. 11C shows a top, schematic view of the winding-type capacitor of the winding-type solid electrolytic capacitor package structure horizontally disposed in the package body and using four conductive pins to respectively electrically connect to the two conductive terminals according to the eleventh embodiment of the instant disclosure.

Referring to FIG. 11C, when the winding-type capacitor 10 is horizontally disposed inside the package body 20, the first conductive pin 101 and the second conductive pin 102 can be concurrently extended from one end side of the winding-type capacitor 10 to electrically connect to the conductive terminal 31, and the third conductive pin 103 and the fourth conductive pin 104 can be concurrently extended from another end side of the winding-type capacitor 10 to electrically connect to the conductive terminal 33.

Figure 11D:
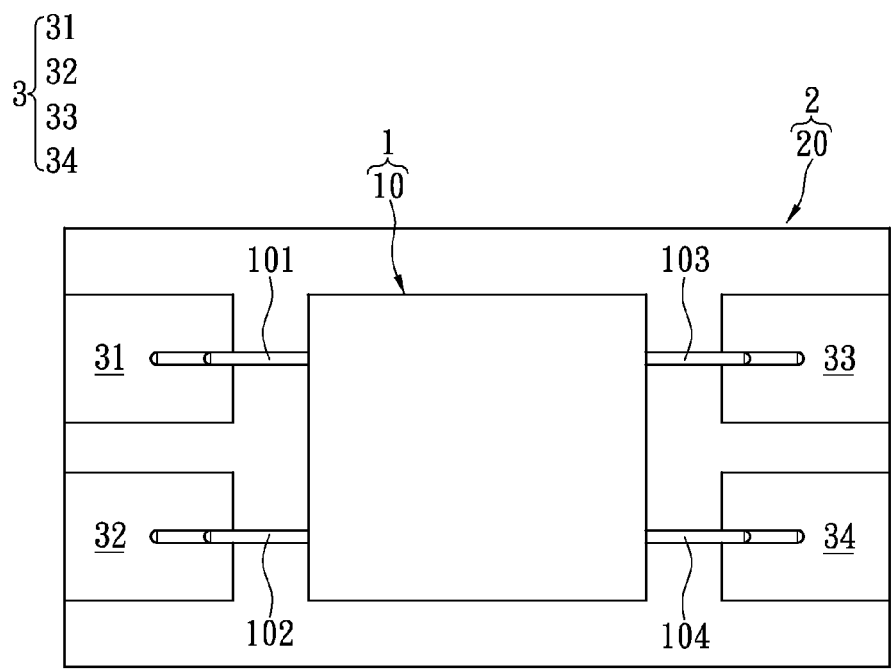
FIG. 11D shows a top, schematic view of the winding-type capacitor of the winding-type solid electrolytic capacitor package structure horizontally disposed in the package body and using four conductive pins to respectively electrically connect to the four conductive terminals according to the eleventh embodiment of the instant disclosure.

Referring to FIG. 11D, when the winding-type capacitor 10 is horizontally disposed inside the package body 20, the first conductive pin 101 and the second conductive pin 102 can be concurrently extended from one end side of the winding-type capacitor 10 to respectively electrically connect to the conductive terminal 31 and the conductive terminal 32, and the third conductive pin 103 and the fourth conductive pin 104 can be concurrently extended from another end side of the winding-type capacitor 10 to respectively electrically connect to the conductive terminal 33 and the conductive terminal 34.

In conclusion, when the winding-type capacitor 10 is enclosed by the package body 20 and electrically connected between the first conductive terminal 31 and the second conductive terminal 32, the first conductive pin 101 and the second conductive pin 102 can be extended and bent along any direction. In addition, because the top side and the bottom side of the first conductive pin 101 and the top side and the bottom side of the second conductive pin 102 are flattened to increase the contact surface, the first conductive pin 101 and the second conductive pin 102 can respectively firmly contact the first conductive terminal 31 and the second conductive terminal 32.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A winding-type solid electrolytic capacitor package structure, comprising:
   a capacitor unit including at least one winding-type capacitor, wherein the at least one winding-type capacitor having at least one first conductive pin and at least one second conductive pin;
   a package unit including a package body enclosing the capacitor unit, wherein the package body has a first lateral face, a second lateral face opposite to the first lateral face, and a bottom face connected between the first lateral face and the second lateral face; and
   a conductive unit including at least one first conductive terminal electrically connected to the at least one first conductive pin and at least one second conductive terminal electrically connected to the at least one second conductive pin, wherein the at least one first conductive terminal and the at least one second conductive terminal are separated from each other, the at least one first conductive terminal has a first embedded portion contacting the at least one first conductive pin and enclosed by the package body and a first exposed portion connected to the first embedded portion and exposed from the package body, and the at least one second conductive terminal has a second embedded portion contacting the at least one second conductive pin and enclosed by the package body and a second exposed portion connected to the second embedded portion and exposed from the package body.

2. The winding-type solid electrolytic capacitor package structure of claim 1, wherein the first embedded portion of the at least one first conductive terminal has a L-shaped contacting section contacting the at least one winding-type capacitor and a first plate contacting section extended outwardly from the L-shaped contacting section and contacting the at least one first conductive pin, the first exposed portion of the at least one first conductive terminal has a first L-shaped exposed section bent downwardly from the first plate contacting section, and the first L-shaped exposed section contacts the bottom face and the first lateral face of the package body, wherein the second embedded portion of the at least one second conductive terminal has a second plate contacting section contacting the at least one second conductive pin, the second exposed portion of the at least one second conductive terminal has a second L-shaped exposed section bent downwardly from the second plate contacting section, and the second L-shaped exposed section contacts the bottom face and the second lateral face of the package body.

3. The winding-type solid electrolytic capacitor package structure of claim 2, wherein the at least one winding-type capacitor is horizontally disposed inside the package body, the at least one winding-type capacitor has a first flat surface and a second flat surface respective formed on a bottom side and a top side thereof, the at least one winding-type capacitor has a first lateral surface and a second lateral surface respectively formed on a left lateral side and a right lateral side thereof, the L-shaped contacting section of the first embedded portion contacts the first flat surface and the first lateral surface of the at least one winding-type capacitor, and the at least one first conductive pin and the at least one second conductive pin are respectively extended from the first lateral surface and the second lateral surface of the at least one winding-type capacitor for respectively contacting the at least one first conductive terminal and the at least one second conductive terminal.

4. The winding-type solid electrolytic capacitor package structure of claim 2, wherein the at least one winding-type capacitor is vertically disposed inside the package body, the at least one winding-type capacitor has a first flat surface and a second flat surface respective formed on a right lateral side and a left lateral side thereof, the at least one winding-type capacitor has a first lateral surface and a second lateral surface respectively formed on a bottom side and a top side thereof, the L-shaped contacting section of the first embedded portion contacts the second flat surface and the first lateral surface of the at least one winding-type capacitor, and the at least one first conductive pin and the at least one second conductive pin are respectively extended from the first lateral surface and the second lateral surface of the at least one winding-type capacitor for respectively contacting the at least one first conductive terminal and the at least one second conductive terminal.

5. The winding-type solid electrolytic capacitor package structure of claim 2, wherein the at least one winding-type capacitor is vertically disposed inside the package body, the at least one winding-type capacitor has a first flat surface and a second flat surface respective formed on a right lateral side and a left lateral side thereof, the at least one winding-type capacitor has a first lateral surface and a second lateral surface respectively formed on a bottom side and a top side thereof, the L-shaped contacting section of the first embedded portion contacts the second flat surface and the first lateral surface of the at least one winding-type capacitor, and both the at least one first conductive pin and the at least one second conductive pin are extended from the second lateral surface of the at least one winding-type capacitor for respectively contacting the at least one first conductive terminal and the at least one second conductive terminal.

6. The winding-type solid electrolytic capacitor package structure of claim 2, wherein the at least one winding-type capacitor is horizontally disposed inside the package body, the at least one winding-type capacitor has a first flat surface and a second flat surface respective formed on a bottom side and a top side thereof, the at least one winding-type capacitor has a first lateral surface and a second lateral surface respectively formed on a left lateral side and a right lateral side thereof, the L-shaped contacting section of the first embedded portion contacts the second flat surface and the first lateral surface of the at least one winding-type capacitor, and the at least one first conductive pin and the at least one second conductive pin are respectively extended from the first lateral surface and the second lateral surface of the at least one winding-type capacitor for respectively contacting the at least one first conductive terminal and the at least one second conductive terminal.

7. The winding-type solid electrolytic capacitor package structure of claim 2, wherein the at least one winding-type capacitor is vertically disposed inside the package body, the at least one winding-type capacitor has a first flat surface and a second flat surface respective formed on a right lateral side and a left lateral side thereof, the at least one winding-type capacitor has a first lateral surface and a second lateral surface respectively formed on a bottom side and a top side thereof, the L-shaped contacting section of the first embedded portion contacts the second flat surface and the second lateral surface of the at least one winding-type capacitor, and the at least one first conductive pin and the at least one second conductive pin are respectively extended from the first lateral surface and the second lateral surface of the at least one winding-type capacitor for respectively contacting the at least one first conductive terminal and the at least one second conductive terminal.

8. The winding-type solid electrolytic capacitor package structure of claim 2, wherein the at least one winding-type capacitor is vertically disposed inside the package body, the at least one winding-type capacitor has a first flat surface and a second flat surface respective formed on a right lateral side and a left lateral side thereof, the at least one winding-type capacitor has a first lateral surface and a second lateral surface respectively formed on a bottom side and a top side thereof, the L-shaped contacting section of the first embedded portion contacts the second flat surface and the second lateral surface of the at least one winding-type capacitor, and both the at least one first conductive pin and the at least one second conductive pin are extended from the second lateral surface of the at least one winding-type capacitor for respectively contacting the at least one first conductive terminal and the at least one second conductive terminal.

9. The winding-type solid electrolytic capacitor package structure of claim 1, wherein the at least one first conductive pin has a first flat top surface and a first flat bottom surface respectively formed on a top side and a bottom side thereof, the at least one second conductive pin has a second flat top surface and a second flat bottom surface respectively formed on a top side and a bottom side thereof, and the first flat bottom surface and the second flat bottom surface respectively contact the at least one first conductive terminal and the at least one second conductive terminal.

10. A winding-type solid electrolytic capacitor package structure, comprising:
a capacitor unit including at least one winding-type capacitor, wherein the at least one winding-type capacitor having at least one first conductive pin and at least one second conductive pin;
a package unit including a package body enclosing the capacitor unit, wherein the package body has a first lateral face, a second lateral face opposite to the first lateral face, and a bottom face connected between the first lateral face and the second lateral face; and a conductive unit including at least one first conductive terminal electrically connected to the at least one first conductive pin and at least one second conductive terminal electrically connected to the at least one second conductive pin, wherein the at least one first conductive terminal and the at least one second conductive terminal are separated from each other, the at least one first conductive terminal has a first exposed bottom surface exposed from the bottom face of the package body and a first exposed lateral surface exposed from the first lateral face of the package body, and the at least one second conductive terminal has a second exposed bottom surface exposed from the bottom face of the package body and a second exposed lateral surface exposed from the second lateral face of the package body.

* * * * *